US011051300B2

(12) United States Patent
Qin et al.

(10) Patent No.: US 11,051,300 B2
(45) Date of Patent: Jun. 29, 2021

(54) METHOD AND APPARATUS FOR TRANSMITTING CONTROL CHANNEL INFORMATION IN AN OFDM SYSTEM

(71) Applicant: HUAWEI TECHNOLOGIES CO., LTD., Guangdong (CN)

(72) Inventors: Yi Qin, Kista (SE); Hua Li, Shanghai (CN); Hao Tang, Shanghai (CN); Zhongfeng Li, Munich (DE)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/520,590

(22) Filed: Jul. 24, 2019

(65) Prior Publication Data
US 2019/0349927 A1 Nov. 14, 2019

Related U.S. Application Data

(63) Continuation of application No. PCT/CN2018/073438, filed on Jan. 19, 2018.

(30) Foreign Application Priority Data

Jan. 25, 2017 (CN) .......................... 201710061378.6

(51) Int. Cl.
H04W 4/00 (2018.01)
H04W 72/04 (2009.01)
(Continued)

(52) U.S. Cl.
CPC ......... *H04W 72/0446* (2013.01); *H04L 5/001* (2013.01); *H04W 72/0453* (2013.01);
(Continued)

(58) Field of Classification Search
CPC ......... H04W 72/0446; H04W 72/0453; H04W 72/1263; H04L 5/001; H04L 27/2602; H04L 5/0053; H04L 5/0023
See application file for complete search history.

(56) References Cited

U.S. PATENT DOCUMENTS

2008/0212506 A1* 9/2008 Lee ..................... H04W 72/042
370/310
2009/0109950 A1* 4/2009 Richardson ......... H04L 27/2602
370/345
(Continued)

FOREIGN PATENT DOCUMENTS

CN 101247171 A 8/2008
CN 101562476 A 10/2009
(Continued)

OTHER PUBLICATIONS

Huawei et al.,"Time and frequency resources for DL control channels",3GPP TSG RAN WG1 Meeting #87 R1-1611210,Reno, USA, Nov. 14 18, 2016,total 3 pages.

*Primary Examiner* — Abdelnabi O Musa
(74) *Attorney, Agent, or Firm* — Womble Bond Dickinson (US) LLP

(57) ABSTRACT

This application provides an information transmission method and apparatus. A first device sends control information to a second device, where the control information is carried on a control channel, a position of an orthogonal frequency division multiplexing OFDM symbol, to which the control channel is mapped, in a time unit is at least one position in a position set, the time unit is a subframe, a slot, or a mini-slot, the control information is used to schedule at least one resource unit, and the resource unit includes at least one OFDM symbol. In the foregoing solution, complexity of detecting a control channel by a receive end may be reduced.

14 Claims, 5 Drawing Sheets

(51) Int. Cl.
  *H04L 5/00*      (2006.01)
  *H04W 72/12*     (2009.01)
  *H04B 7/0413*    (2017.01)
  *H04L 27/26*     (2006.01)

(52) U.S. Cl.
  CPC ....... *H04W 72/1263* (2013.01); *H04B 7/0413* (2013.01); *H04L 27/2602* (2013.01)

(56) References Cited

U.S. PATENT DOCUMENTS

| | | | |
|---|---|---|---|
| 2010/0091680 A1* | 4/2010 | Chun | H04L 5/0023 |
| | | | 370/252 |
| 2014/0050190 A1 | 2/2014 | Shimezawa et al. | |
| 2015/0208394 A1* | 7/2015 | Seo | H04W 72/042 |
| | | | 370/329 |
| 2016/0302180 A1 | 10/2016 | Nory et al. | |
| 2018/0048437 A1 | 2/2018 | Seo et al. | |
| 2018/0279281 A1 | 9/2018 | Li et al. | |
| 2019/0356459 A1* | 11/2019 | Wang | H04L 5/0082 |

FOREIGN PATENT DOCUMENTS

| | | |
|---|---|---|
| CN | 101001437 B | 3/2011 |
| CN | 103493561 A | 1/2014 |
| CN | 103875202 A | 6/2014 |
| CN | 104243087 A | 12/2014 |
| CN | 104253681 A | 12/2014 |
| CN | 106851744 A | 6/2017 |
| WO | 2016178439 A1 | 11/2016 |

\* cited by examiner

METHOD AND APPARATUS FOR TRANSMITTING CONTROL CHANNEL INFORMATION IN AN OFDM SYSTEM

CROSS-REFERENCE TO RELATED APPLICATIONS

This application is a continuation of International Application No. PCT/CN2018/073438, filed on Jan. 19, 2018, which claims priority to Chinese Patent Application No. 201710061378.6, filed on Jan. 25, 2017. The disclosures of the aforementioned applications are hereby incorporated by reference in their entireties.

TECHNICAL FIELD

This application relates to the field of communications technologies, and in particular, to an information transmission method and apparatus.

BACKGROUND

In a 5th generation (5G) communications system, a basic time unit of physical resource scheduling may be a slot (slot) or a mini-slot (mini-slot). A shorter latency or faster beam switching can be achieved by using the mini-slot. A length of the mini-slot is less than a length of the slot. One mini-slot may include one or more orthogonal frequency division multiplexing (OFDM) symbols. A start position of a mini-slot in a subframe is not limited to the first OFDM symbol in the subframe. A position of the mini-slot in the subframe is carried on a control channel in a previous subframe, and a terminal needs to detect the control channel to acquire control information.

A position of the control channel in the subframe may dynamically change, and therefore, the terminal may need to detect the control channel at a plurality of positions, thereby causing relatively great complexity.

SUMMARY

Embodiments of this application provide an information transmission method and apparatus, to reduce complexity of detecting a control channel by a terminal.

According to a first aspect, an information transmission method is provided and includes:

sending, by a first device, control information to a second device, where the control information is carried on a control channel, a position of an orthogonal frequency division multiplexing OFDM symbol, to which the control channel is mapped, in a time unit is at least one position in a position set, and the time unit is a subframe, a slot, or a mini-slot; where the control information is used to schedule at least one resource unit, and the resource unit includes at least one OFDM symbol.

In the foregoing solution, complexity of detecting a control channel by a receive end is reduced.

With reference to the first aspect, in one embodiment, the at least one resource unit is distributed in a plurality of subframes; or the at least one resource unit is distributed in a plurality of slots; or the at least one resource unit is distributed in at least one slot and at least one subframe.

In one embodiment, the position set includes at least one of the following elements: OFDM symbol #3 in a subframe, OFDM symbol #5 in the subframe, OFDM symbol #6 in the subframe, OFDM symbol #9 in the subframe, OFDM symbol #10 in the subframe, OFDM symbol #12 in the subframe, and OFDM symbol #13 in the subframe; or the position set includes at least one of the following elements: OFDM symbol #2 in a slot, OFDM symbol #3 in the slot, OFDM symbol #5 in the slot, OFDM symbol #6 in the slot, OFDM symbol #9 in the slot, OFDM symbol #10 in the slot, OFDM symbol #12 in the slot, and OFDM symbol #13 in the slot.

In the foregoing solution, interference between different systems may be reduced.

In one embodiment, the method further includes: sending, by the first device, first signaling to the second device, where the first signaling includes an index of the OFDM symbol to which the control channel is mapped.

In one embodiment, the control information includes at least one type of the following information of the at least one resource unit: time domain information, frequency domain information, and code domain information.

In one embodiment, the method further includes: sending, by the first device, second signaling to the second device, where the second signaling indicates at least one type of the following information of the at least one resource unit: time domain information, frequency domain information, and code domain information.

In one embodiment, the time domain information includes at least one of the following: a time domain length of the resource unit and a start position of the resource unit.

In one embodiment, the at least one resource unit may include at least one of the following: a slot, a mini-slot, a subframe, a slot set, a mini-slot set, and a subframe set.

According to a second aspect, an information transmission method is provided and includes:

receiving, by a terminal, control information, where the control information is carried on a control channel, a position of an orthogonal frequency division multiplexing OFDM symbol, to which the control channel is mapped, in a time unit is at least one position in a position set, and the time unit is a subframe, a slot, or a mini-slot; where the control information is used to schedule at least one resource unit, and the resource unit includes at least one OFDM symbol.

In the foregoing solution, complexity of detecting a control channel by a terminal is reduced.

With reference to the second aspect, in one embodiment, the at least one resource unit is distributed in a plurality of subframes; or the at least one resource unit is distributed in a plurality of slots; or the at least one resource unit is distributed in at least one slot and at least one subframe.

In one embodiment, the position set includes at least one of the following elements: OFDM symbol #3 in a subframe, OFDM symbol #5 in the subframe, OFDM symbol #6 in the subframe, OFDM symbol #9 in the subframe, OFDM symbol #10 in the subframe, OFDM symbol #12 in the subframe, and OFDM symbol #13 in the subframe; or the position set includes at least one of the following elements: OFDM symbol #2 in a slot, OFDM symbol #3 in the slot, OFDM symbol #5 in the slot, OFDM symbol #6 in the slot, OFDM symbol #9 in the slot, OFDM symbol #10 in the slot, OFDM symbol #12 in the slot, and OFDM symbol #13 in the slot.

In the foregoing solution, interference between different systems may be reduced.

In one embodiment, the method further includes: receiving, by the terminal, first signaling, where the first signaling includes an index of the OFDM symbol to which the control channel is mapped.

In one embodiment, the control information includes at least one type of the following information of the at least one resource unit: time domain information, frequency domain information, and code domain information.

In one embodiment, the method further includes: receiving, by the terminal, second signaling, where the second signaling indicates at least one type of the following information of the at least one resource unit: time domain information, frequency domain information, and code domain information.

In one embodiment, the method further includes: receiving, by the terminal, second signaling, where the second signaling indicates at least one type of the following information of the at least one resource unit: time domain information, frequency domain information, and code domain information.

In one embodiment, the at least one resource unit may include at least one of the following: a slot, a mini-slot, a subframe, a slot set, a mini-slot set, and a subframe set.

According to a third aspect, a network device is provided and includes:

a processor, configured to generate control information, where the control information is carried on a control channel, a position of an orthogonal frequency division multiplexing OFDM symbol, to which the control channel is mapped, in a time unit is at least one position in a position set, the time unit is a subframe, a slot, or a mini-slot, the control information is used to schedule at least one resource unit, and the resource unit includes at least one OFDM symbol; and a transceiver, configured to send the control information.

In the foregoing solution, complexity of detecting a control channel by a receive end is reduced.

With reference to the third aspect, in one embodiment, the at least one resource unit is distributed in a plurality of subframes; or the at least one resource unit is distributed in a plurality of slots; or the at least one resource unit is distributed in at least one slot and at least one subframe.

In one embodiment, the position set includes at least one of the following elements: OFDM symbol #3 in a subframe, OFDM symbol #5 in the subframe, OFDM symbol #6 in the subframe, OFDM symbol #9 in the subframe, OFDM symbol #10 in the subframe, OFDM symbol #12 in the subframe, and OFDM symbol #13 in the subframe; or the position set includes at least one of the following elements: OFDM symbol #2 in a slot, OFDM symbol #3 in the slot, OFDM symbol #5 in the slot, OFDM symbol #6 in the slot, OFDM symbol #9 in the slot, OFDM symbol #10 in the slot, OFDM symbol #12 in the slot, and OFDM symbol #13 in the slot.

In the foregoing solution, interference between different systems may be reduced.

In one embodiment, the transceiver is further configured to send first signaling, where the first signaling includes an index of the OFDM symbol to which the control channel is mapped.

In one embodiment, the control information includes at least one type of the following information of the at least one resource unit: time domain information, frequency domain information, and code domain information.

In one embodiment, the transceiver is further configured to send second signaling, where the second signaling indicates at least one type of the following information of the at least one resource unit: time domain information, frequency domain information, and code domain information.

In one embodiment, the time domain information includes at least one of the following: a time domain length of the resource unit and a start position of the resource unit.

In one embodiment, the at least one resource unit may include at least one of the following: a slot, a mini-slot, a subframe, a slot set, a mini-slot set, and a subframe set.

According to a fourth aspect, a terminal is provided and includes:

a transceiver, configured to receive a control channel, where the control channel is used to carry control information, a position of an orthogonal frequency division multiplexing OFDM symbol, to which the control channel is mapped, in a time unit is at least one position in a position set, the time unit is a subframe, a slot, or a mini-slot, the control information is used to schedule at least one resource unit, and the resource unit includes at least one OFDM symbol; and a processor, configured to detect the control channel.

In the foregoing solution, complexity of detecting a control channel by a receive end is reduced.

With reference to the fourth aspect, in one embodiment, the at least one resource unit is distributed in a plurality of subframes; or the at least one resource unit is distributed in a plurality of slots; or the at least one resource unit is distributed in at least one slot and at least one subframe.

In one embodiment, the position set includes at least one of the following elements: OFDM symbol #3 in a subframe, OFDM symbol #5 in the subframe, OFDM symbol #6 in the subframe, OFDM symbol #9 in the subframe, OFDM symbol #10 in the subframe, OFDM symbol #12 in the subframe, and OFDM symbol #13 in the subframe; or the position set includes at least one of the following elements: OFDM symbol #2 in a slot, OFDM symbol #3 in the slot, OFDM symbol #5 in the slot, OFDM symbol #6 in the slot, OFDM symbol #9 in the slot, OFDM symbol #10 in the slot, OFDM symbol #12 in the slot, and OFDM symbol #13 in the slot.

In the foregoing solution, interference between different systems may be reduced.

In one embodiment, the transceiver is further configured to receive first signaling, where the first signaling includes an index of the OFDM symbol to which the control channel is mapped.

In one embodiment, the control information includes at least one type of the following information of the at least one resource unit: time domain information, frequency domain information, and code domain information.

In one embodiment, the transceiver is further configured to receive second signaling, where the second signaling indicates at least one type of the following information of the at least one resource unit: time domain information, frequency domain information, and code domain information.

In one embodiment, the time domain information includes at least one of the following: a time domain length of the resource unit and a start position of the resource unit.

In one embodiment, the at least one resource unit may include at least one of the following: a slot, a mini-slot, a subframe, a slot set, a mini-slot set, and a subframe set.

In one embodiment, the network device provided in this application may include a corresponding module configured to execute an action of the network device in the foregoing method design. The module may be software and/or hardware.

In one embodiment, the terminal provided in this application may include a corresponding module configured to execute an action of the terminal in the foregoing method design. The module may be software and/or hardware.

Another aspect of this application provides a computer-readable storage medium. The computer-readable storage medium stores an instruction. When the instruction runs on a computer, the computer performs the method in the foregoing aspect.

Still another aspect of this application provides a computer program product that includes an instruction. When the instruction runs on a computer, the computer performs the method in the foregoing aspect.

DESCRIPTION OF DRAWINGS

To describe the technical solutions in embodiments of the present invention or in the prior art more clearly, the following briefly describes the accompanying drawings required for describing the embodiments or the prior art.

DESCRIPTION OF EMBODIMENTS

With reference to the accompanying drawings, the following describes in detail the embodiments provided in the present invention. The network architecture and a service scenario that are described in the embodiments of the present invention are used to describe the technical solutions in the embodiments of the present invention more clearly, but do not limit the technical solutions provided in the embodiments of the present invention. A person of ordinary skill in the art may know that the technical solutions provided in the embodiments of the present invention are also applicable to similar technical problems as the network architecture evolves and a new service scenario appears.

Figure 1:
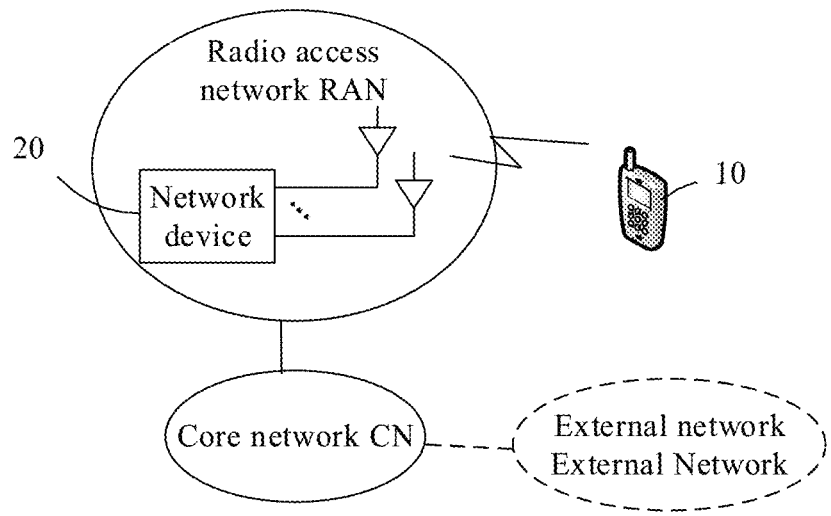
FIG. 1 is a schematic diagram of a possible system structure for implementing an embodiment of the present invention.

FIG. 1 is a schematic diagram of a possible system network in this application. As shown in FIG. 1, at least one terminal 10 communicates with a radio access network (RAN). The RAN includes at least one network device 20. For clarity, only one network device and one user equipment (UE) are shown in the figure. The RAN is connected to a core network (CN). In one embodiment, the CN may be coupled to one or more external networks (External Network) such as the Internet and a public switched telephone network (PSTN).

For ease of understanding, some nouns involved in this application are described below.

In this application, nouns "network" and "system" are usually interchangeably used, but meanings of the nouns may be understood by a person skilled in the art. User equipment (UE) is a terminal device having a communication function. The user equipment may also be referred to as a terminal, and may include a handheld device, vehicle-mounted device, wearable device, or computation device that has a wireless communication function, another processing device connected to a wireless modem, or the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless phone, and a wireless local loop station. For ease of description, in this application, these devices are referred to as user equipment UE or a terminal. A network device may be a base station (BS), a wireless access device in a cloud network, or a device having a wireless transceiver function such as a relay station. The base station may also be referred to as a base station device, and is a device that is deployed in a wireless access network to provide a wireless communication function. The base station may have different names in different wireless access systems. For example, the base station is referred to as a NodeB (NodeB) in a universal mobile telecommunications system (UMTS) network, the base station is referred to as an evolved NodeB (eNB or eNodeB) in an LTE network, and the base station may be referred to as a transmission reception point (TRP), a network node, or a gNodeB (g-Node, gNB) in a future 5G system.

Figure 2:
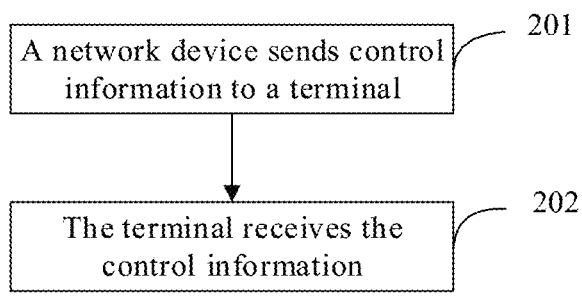
FIG. 2 is a flowchart of an information transmission method according to an embodiment of the present invention.

An embodiment of the present invention provides an information transmission method. The method may be applied to the system shown in FIG. 1. The following uses an example in which a network device and a terminal implement the method for description. As shown in FIG. 2, the method includes the following operations.

Operation 201: The network device sends control information to the terminal.

The control information is carried on a control channel, a position of an orthogonal frequency division multiplexing (OFDM) symbol, to which the control channel is mapped, in a time unit is at least one position in a position set, and the time unit is a subframe or a slot.

The control information is used to schedule at least one resource unit, and the resource unit includes at least one OFDM symbol. The resource unit may be used for transmission of a subsequent downlink or uplink channel or signal.

Operation 202: The terminal receives the control information.

In one embodiment, the control channel may be a physical downlink control channel (PDCCH).

In one embodiment, the time unit is a subframe or a slot, or the time unit is a subframe set or a slot set.

In the foregoing solution, the terminal may detect the control channel at the position of the OFDM symbol indicated in the position set. Because the position set is fixed rather than dynamically changing, complexity of detecting the control channel by the terminal is reduced.

In one embodiment, the resource unit scheduled by using the control information is distributed in a plurality of subframes, a plurality of slots, a plurality of mini-slots, or a combination of subframes, slots, or mini-slots. The control information may be used to schedule resources across subframes or slots, thereby improving resource scheduling efficiency. For example, a plurality of resource units scheduled by using the control information are respectively located in different subframes, or a resource unit scheduled by using the control information includes time-frequency resources of different subframes. The plurality of subframes, the plurality of slots, or the plurality of mini-slots may be consecutive or inconsecutive. The subframes, the slots, or the mini-slots in the combination may be consecutive or inconsecutive.

In one embodiment, the position set is predefined, fixed, or configured by the network device.

The position set may include at least one of the following elements: OFDM symbol #3 in a subframe, OFDM symbol #5 in the subframe, OFDM symbol #6 in the subframe, OFDM symbol #9 in the subframe, OFDM symbol #10 in the subframe, OFDM symbol #12 in the subframe, and OFDM symbol #13 in the subframe.

Alternatively, the position set includes at least one of the following elements: OFDM symbol #2 in a slot, OFDM symbol #3 in the slot, OFDM symbol #5 in the slot, OFDM symbol #6 in the slot, OFDM symbol #9 in the slot, OFDM symbol #10 in the slot, OFDM symbol #12 in the slot, and OFDM symbol #13 in the slot.

It should be noted that in this embodiment of the present invention, in a subframe or slot, a start OFDM symbol is numbered 0.

In one embodiment, when the position set includes only one element, it may be considered that a position of the control channel is fixed.

In one embodiment, the position set may include one, some, or all of OFDM symbols occupied by the control channel.

A 5G communications system may use a same frequency band as a long term evolution (LTE) system. When a control channel occupies an OFDM symbol in the position set, mutual interference between the two communications systems may be reduced.

When a control channel of the 5G communications system uses OFDM symbol #5 or OFDM symbol #6, it is relatively easy to eliminate mutual interference between the two systems because of a relatively low probability that a control channel or a reference signal of the LTE system occupies the two OFDM symbols.

In one embodiment, the position set may vary with different subcarrier spacings, different cyclic prefix lengths, or different time unit types. In other words, the position set may be determined based on at least one of the subcarrier spacing, the cyclic prefix length, or the time unit type.

For example, for a different subcarrier spacing, a position set may be determined based on a position set of a reference subcarrier spacing and a relationship between the subcarrier spacing and the reference subcarrier spacing. The reference subcarrier spacing is predefined or configured by the network device. For example, the reference subcarrier spacing is 15 kHz, an actually used subcarrier spacing is 30 kHz, and in this case, a position set of 15 kHz is OFDM symbol #3 in the subframe, OFDM symbol #5 in the subframe, OFDM symbol #6 in the subframe, OFDM symbol #9 in the subframe, OFDM symbol #10 in the subframe, OFDM symbol #12 in the subframe, and OFDM symbol #13 in the subframe. A symbol in a position set corresponding to the 30 kHz subcarrier spacing is a symbol corresponding to a symbol in the position set corresponding to the 15 kHz subcarrier spacing, namely, a symbol of the 30 kHz subcarrier spacing that occupies a same time resource as the symbol in the position set when the subframe uses the 15 kHz subcarrier spacing. For example, OFDM symbol #5 in a 15 kHz subframe corresponds to OFDM symbol #11 and OFDM symbol #12 in a 30 kHz subframe. Therefore, the position set of 30 kHz is OFDM symbol #6 and OFDM symbol #7 in the subframe, OFDM symbol #10 and OFDM symbol #11 in the subframe, OFDM symbol #12 and OFDM symbol #13 in the subframe, OFDM symbol #18 and OFDM symbol #19 in the subframe, OFDM symbol #20 and OFDM symbol #21 in the subframe, OFDM symbol #24 and OFDM symbol #25 in the subframe, and OFDM symbol #26 and OFDM symbol #27 in the subframe.

In one embodiment, for a different subcarrier spacing, the network side device may configure a different position set, to determine a position set based on a used subcarrier spacing.

In one embodiment, for a different cyclic prefix length, a position set may also be determined based on a position set corresponding to a reference cyclic prefix length and a position set corresponding to the cyclic prefix length and the reference cyclic prefix length. The reference cyclic prefix length may be predefined or configured by the network device.

In one embodiment, for a different cyclic prefix length, the network side device may configure a different position set, to determine a position set based on a used cyclic prefix length.

In one embodiment, for a different time unit type, a position set may also be determined based on a position set corresponding to a reference time unit type and a position set corresponding to the time unit type and the reference time unit type. The reference time unit type may be predefined or configured by the network device, and the time unit type includes a subframe, a slot with a length of seven symbols, a slot with a length of 14 symbols, or a mini-slot.

In one embodiment, for a different time unit type, the network side device may configure a different position set, to determine a position set based on a used time unit type.

Figure 3:
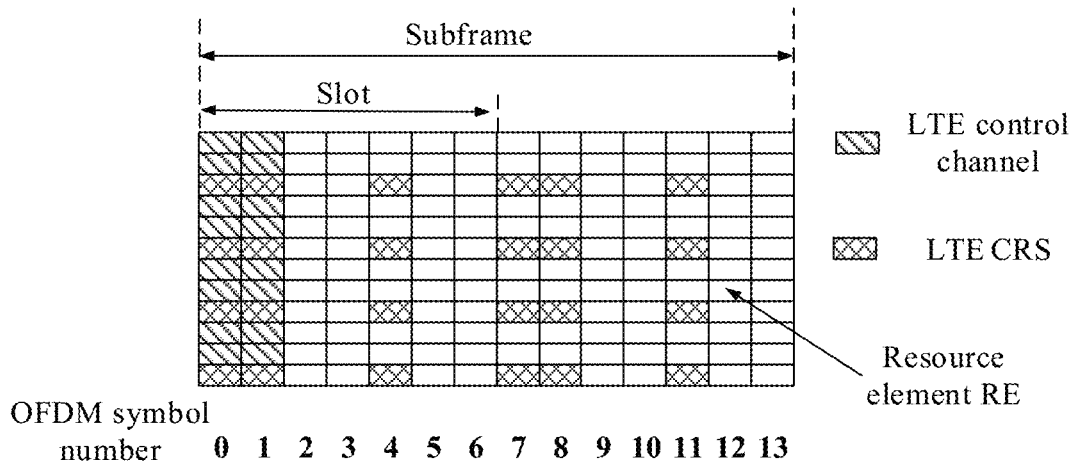
FIG. 3 is a schematic diagram of time-frequency resource allocation according to an embodiment of the present invention.
Figure 4:
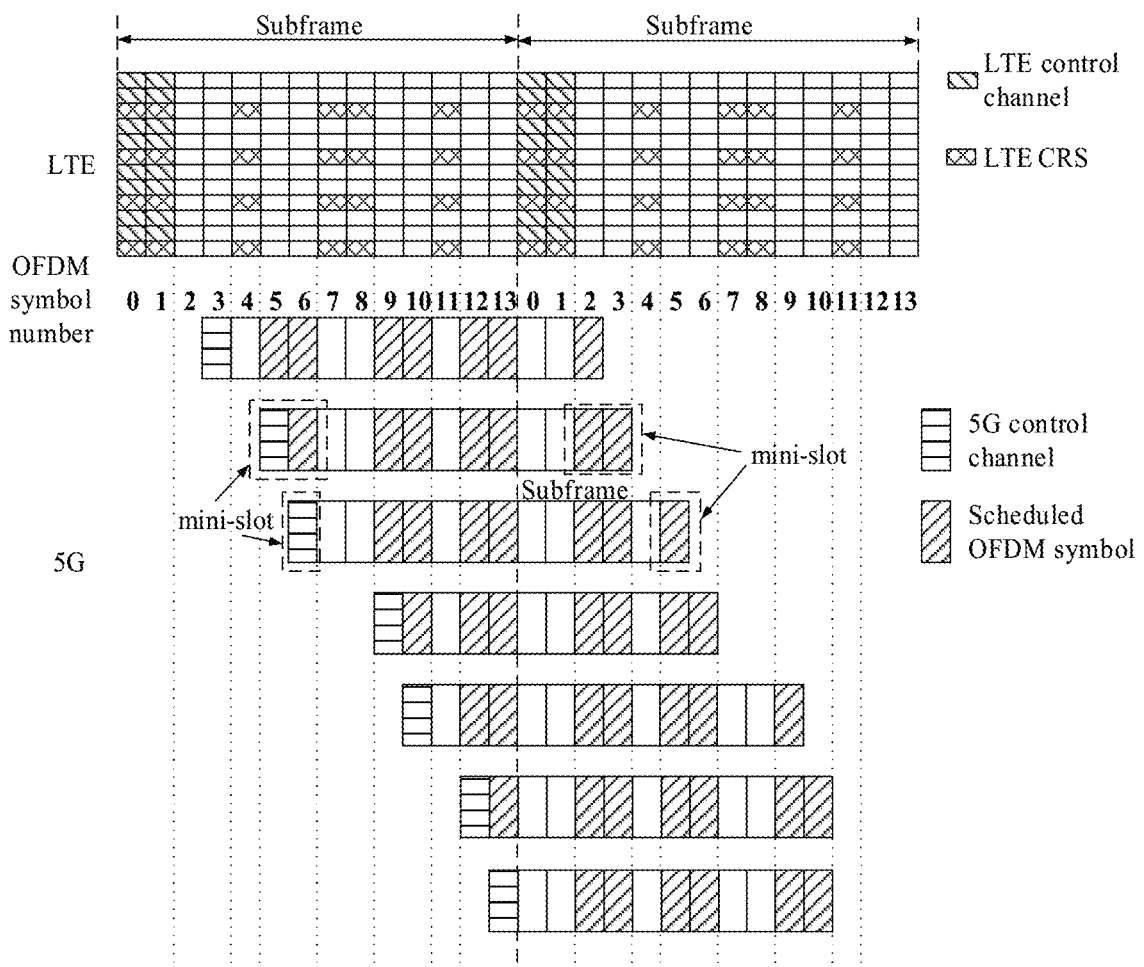
FIG. 4 is a schematic diagram of resource scheduling according to an embodiment of the present invention.

The following uses an example to further describe the OFDM symbols occupied by the control channel and the resource unit scheduled by using the control information. In the LTE system, a control channel (for example, a PDCCH) and a reference signal occupy some time-frequency resources. For example, as shown in FIG. 3, a time-frequency resource that may be occupied by a control channel and a cell-specific reference signal (cell-specific reference signal) is marked assuming that one subframe includes two slots and one slot includes seven OFDM symbols. In the 5G communications system, the position of the control channel may be determined based on usage of a time-frequency resource in an LTE system. For example, as shown in FIG. 4, a control channel of the 5G communications system may use OFDM symbol #3, OFDM symbol #5, OFDM symbol #6, OFDM symbol #9, OFDM symbol #10, OFDM symbol #12, or OFDM symbol #13. The OFDM symbol scheduled by using the control information may also be determined based on usage of the time-frequency resource in the LTE system, and may be scheduled across subframes. For details, refer to a plurality of possible cases shown in FIG. 4. One or more OFDM symbols scheduled by using the control information may be referred to as a mini-slot. The mini-slot may include an OFDM symbol in which the control channel is located.

In one embodiment, the method may further include: sending, by the network device, first signaling to the terminal, where the first signaling includes an index of the OFDM symbol to which the control channel is mapped.

The index may be a number of the OFDM symbol in a slot or a subframe, or an index of the OFDM symbol in a preset OFDM symbol set.

The first signaling may be higher layer signaling, for example, radio resource control (RRC) signaling, master information block (MIB) signaling, or system information block (SIB) signaling; or may be media access control (MAC) layer signaling, for example, signaling carried in a MAC control element (MAC CE); or may be physical layer signaling, for example, downlink control information (DCI). The first signaling may be alternatively a combination of the foregoing different types of signaling.

In one embodiment, when the first signaling is the higher layer signaling or the MAC layer signaling, the first signaling may be semi-statically sent.

In one embodiment, in a special scenario, the position set may include all OFDM symbols in a subframe or a slot. In this scenario, it may be considered that the position set is not defined, the terminal is notified of the position of the control channel only through the first signaling, and the first signaling is the higher layer signaling or the MAC layer signaling.

In one embodiment, when the position set includes a plurality of OFDM symbols, alternatively, the network device may not notify the position of the control channel. In this case, the control channel may be transmitted on some or all of the symbols in the position set, and the terminal may blindly detect the control channel on the symbols included in the position set.

In one embodiment, the control information includes at least one type of the following information of the resource unit: time domain information, frequency domain information, and code domain information.

The control information may include only information about some resource units.

In one embodiment, the method further includes: sending, by the network device, second signaling to the terminal, where the second signaling indicates at least one type of the following information of the resource unit: time domain information, frequency domain information, and code domain information.

The second signaling may indicate only the information about the some resource units. For example, the control channel carries scheduling information of some resource units, and the second signaling carries scheduling information of remaining resource units; or, scheduling information of some resource units is carried on the control channel, scheduling information of some resource units is carried in the second signaling, and scheduling information of remaining resource units is jointly determined based on the control information and the second signaling; or, scheduling information of some resource units is carried in second signaling, and scheduling information of remaining resource units is jointly determined based on the control information and the second signaling; or, scheduling information of some resource units is carried on the control channel, and scheduling information of remaining resource units is jointly determined based on the control information and the second signaling.

The second signaling may be higher layer signaling, for example, radio resource control (RRC) signaling, master information block (MIB) signaling, or system information block (SIB) signaling; media access control (MAC) layer signaling, for example, signaling carried in a MAC control element (MAC CE); or physical layer signaling, for example, downlink control information (DCI). The second signaling may be alternatively a combination of the foregoing different types of signaling.

In one embodiment, information about a time domain resource, a frequency domain resource, or a code domain resource is an identifier of the time domain resource, the frequency domain resource, or the code domain resource, or an index of one or more items in a time domain resource set, a frequency domain resource set, or a code domain resource set. The time domain resource set, the frequency domain resource set, or the code domain resource set is predefined or configured by the network device.

In one embodiment, the time domain information, the frequency domain information, or the code domain information of the resource unit may include information about a time domain resource, a frequency domain resource, or a code domain resource, in the resource unit, that may be used for channel or signal transmission. The time domain resource, the frequency domain resource, or the code domain resource that may be used for channel or signal transmission includes at least one of the following: a subcarrier, an OFDM symbol, a resource element (RE), an RE set, a resource block (RB), an RB group, an RB set, a sequence, a scrambling sequence, and a cyclic shift of a sequence. The time domain resource, the frequency domain resource, or the code domain resource that may be used for channel or signal transmission is an identifier of the time domain resource, the frequency domain resource, or the code domain resource, or an index of one or more items in a time domain resource set, a frequency domain resource set, or a code domain resource set. The time domain resource set, the frequency domain resource set, or the code domain resource set is predefined or configured by the network device. For example, in a specific resource unit scheduled by using the control information, if only some of subcarriers are available, the time domain information, the frequency domain information, or the code domain information needs to indicate a specific subcarrier; in a specific resource unit scheduled by using the control information, if only some of symbols are available, the time domain information, the frequency domain information, or the code domain information needs to indicate an available symbol.

In one embodiment, the time domain information, the frequency domain information, or the code domain information of the resource unit may include information about a time domain resource, a frequency domain resource, or a code domain resource, in the resource unit, that may not be used for channel or signal transmission. The time domain resource, the frequency domain resource, or the code domain resource that may not be used for channel or signal transmission includes at least one of the following: a subcarrier, an OFDM symbol, a resource element (resource element, RE), an RE set, a resource block (resource block, RB), an RB group, an RB set, a sequence, a scrambling sequence, and a cyclic shift of a sequence. The time domain resource, the frequency domain resource, or the code domain resource that may not be used for channel or signal transmission is an identifier of the time domain resource, the frequency domain resource, or the code domain resource, or an index of one or more items in a time domain resource set, a frequency domain resource set, or a code domain resource set. The time domain resource set, the frequency domain resource set, or the code domain resource set is predefined or configured by the network device. For example, in a specific resource unit scheduled by using the control information, if only some of subcarriers are available, the time domain information, the frequency domain information, or the code domain information needs to indicate a specific unavailable subcarrier; in a specific resource unit scheduled by using the control information, if only some of symbols are available, the time domain information, the frequency domain information, or the code domain information needs to indicate an unavailable symbol. For example, when the communications system in this embodiment and an LTE/LTE-Advanced system coexist, the time domain information, the frequency domain information, and the code domain information may include information about a PDCCH symbol of the LTE/LTE-Advanced system or information about symbols or REs occupied by a CRS in the LTE system, and are used to indicate that no channel or signal is transmitted on these symbols or REs in the communications system in this embodiment, thereby avoiding interference with the LTE/LTE-A system.

The foregoing several resource indication manners may be combined for use.

In one embodiment, the time domain information includes at least one of the following: a time domain length of the resource unit and a start position of the resource unit.

In one embodiment, the time domain length may be one time domain length in a preset time domain length set. For example, a time domain length set {1,2,4,7} is predefined, and the time domain length may be selected from the set.

In one embodiment, the resource unit may include one or a combination of the following: a slot, a mini-slot, a subframe, a slot set, a mini-slot set, and a subframe set. For example, the control information is used to schedule a plurality of resource units, among which some are slots and some others are mini-slots.

In one embodiment, the time domain information, the frequency domain information, and the code domain information are related to a type of a corresponding time unit or time unit combination. A specific type of a time unit may indicate that the time unit belongs to a specific preset time unit set, and a specific type of a time unit combination may indicate that the time unit belongs to a specific preset time unit combination set.

Figure 5:
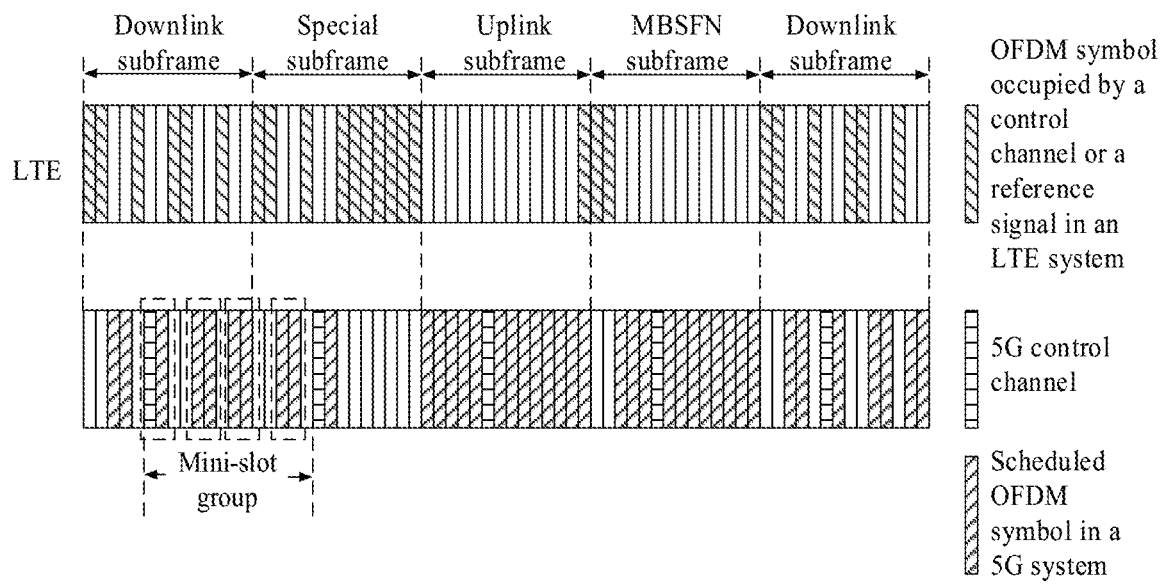
FIG. 5 is a schematic diagram of another resource scheduling according to an embodiment of the present invention.

For example, for a scenario in which a 5G system and an LTE system use a same frequency band, frames in two systems may be aligned. For a different subframe type in the LTE system, a subframe or a slot in the 5G system is defined as a different type, and corresponding time domain information, frequency domain information, or code domain information may vary. For example, as shown in FIG. 5, an OFDM symbol scheduled by using the control information in the 5G system changes with a subframe type in the LTE system.

In one embodiment, the resource scheduled by using the control information may be a part of an available resource of a primary synchronization signal (PSS), a secondary synchronization signal (SSS), a physical broadcast channel (PBCH), a channel state information-reference signal (CSI-RS), a physical random access channel (PRACH), a dedicated reference signal (DRS), or a sounding reference signal (SRS).

Figure 6:
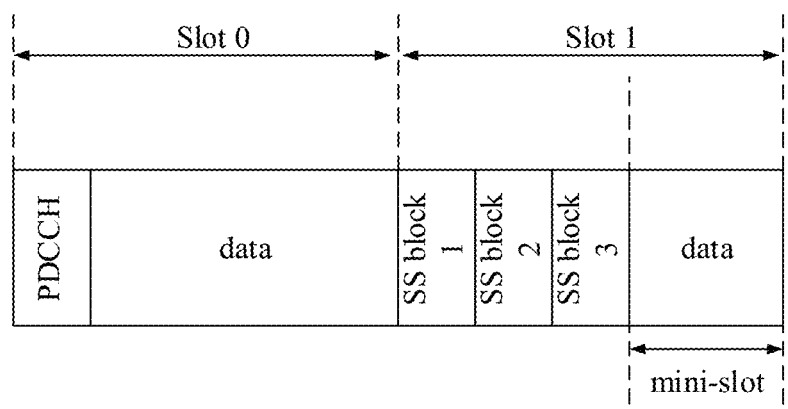
FIG. 6 is a schematic diagram of another resource scheduling according to an embodiment of the present invention.

For example, as shown in FIG. 6, available resources of a synchronization signal may be all resources in a slot 1, but within a period of time the synchronization signal may use only some of the resources, which are, for example, synchronization signal blocks SS block 1, SS block 2, and SS block 3 marked in the figure. In this case, the PDCCH may schedule unused resources in the slot 1, which are, for example, data data areas shown in the figure. In this case, resources scheduled by the PDCCH are a slot and a mini-slot.

The embodiments of the present invention further provide an apparatus embodiment for implementing operations and methods in the method embodiments. The methods, operations, technical details, and technical effects in the method embodiments are also applicable to the apparatus embodiment, and details are not described below again.

Figure 7:
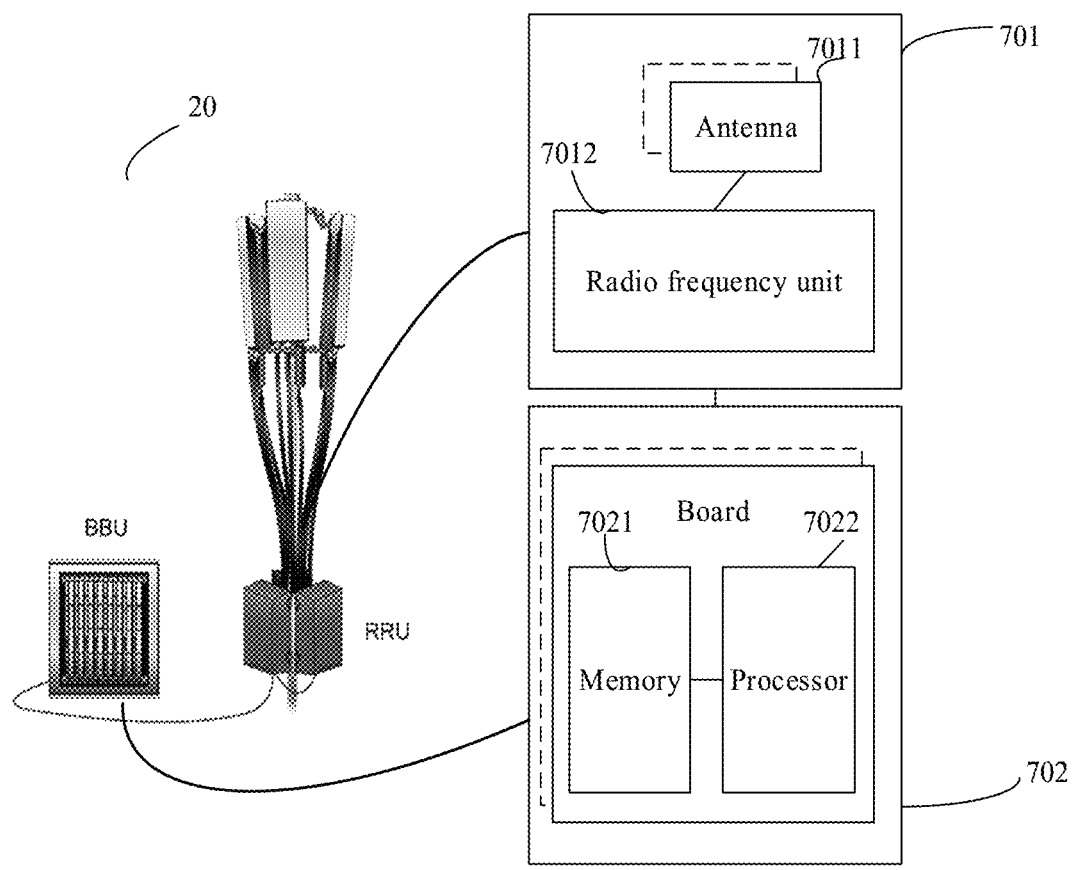
FIG. 7 is a schematic structural diagram of a network device according to an embodiment of the present invention.

FIG. 7 is a schematic structural diagram of a network device. The network device may be applied to the system shown in FIG. 1. The network device 20 includes one or more remote radio units (RRUs) 701 and one or more baseband units (BBUs) 702. The RRU 701 may be referred to as a transceiver unit, a transceiver, a transceiver circuit, a transceiver, or the like, and may include at least one antenna 7011 and a radio frequency unit 7012. The RRU 701 is mainly configured to: receive/send a radio frequency signal, and implement conversion between a radio frequency signal and a baseband signal. For example, the RRU 701 is configured to send a signaling indication or a reference signal in the foregoing embodiment to a terminal. The BBU 702 is mainly configured to perform baseband processing, control the network device, and the like. The RRU 701 and the BBU 702 may be physically disposed together, or may be physically separately disposed, and in other words, the RRU 701 and the BBU 702 form a distributed base station.

The BBU 702 is a control center of the network device, may also be referred to as a processing unit, and is mainly configured to complete a baseband processing function, such as channel coding, multiplexing, modulation, or frequency spread. In an example, the BBU 702 may include one or more boards, and a plurality of boards may support a radio access network (such as a 5G network) of a single access standard, or may support radio access networks of different access standards. The BBU 702 further includes a memory 7021 and a processor 7022. The memory 7021 is configured to store a necessary instruction and data. The processor 7022 is configured to control the network device to perform a necessary action. The memory 7021 and the processor 7022 may serve the one or more boards. In other words, a memory and a processor may be independently disposed on each board. Alternatively, a plurality of boards may share a same memory and a same processor. In addition, a necessary circuit is further disposed on each board.

The network device may be configured to implement the method in the foregoing method embodiment, and details are as follows:

The processor is configured to generate control information, where the control information is carried on a control channel, a position of an orthogonal frequency division multiplexing OFDM symbol, to which the control channel is mapped, in a time unit is at least one position in a position set, the time unit is a subframe, a slot, or a mini-slot, the control information is used to schedule at least one resource unit, and the resource unit includes at least one OFDM symbol; and the transceiver is configured to send the control information.

In one embodiment, the transceiver is further configured to send first signaling, where the first signaling includes an index of the OFDM symbol to which the control channel is mapped.

In one embodiment, the transceiver is further configured to send second signaling, where the second signaling indicates at least one type of the following information of the at least one resource unit: time domain information, frequency domain information, and code domain information.

Figure 8:
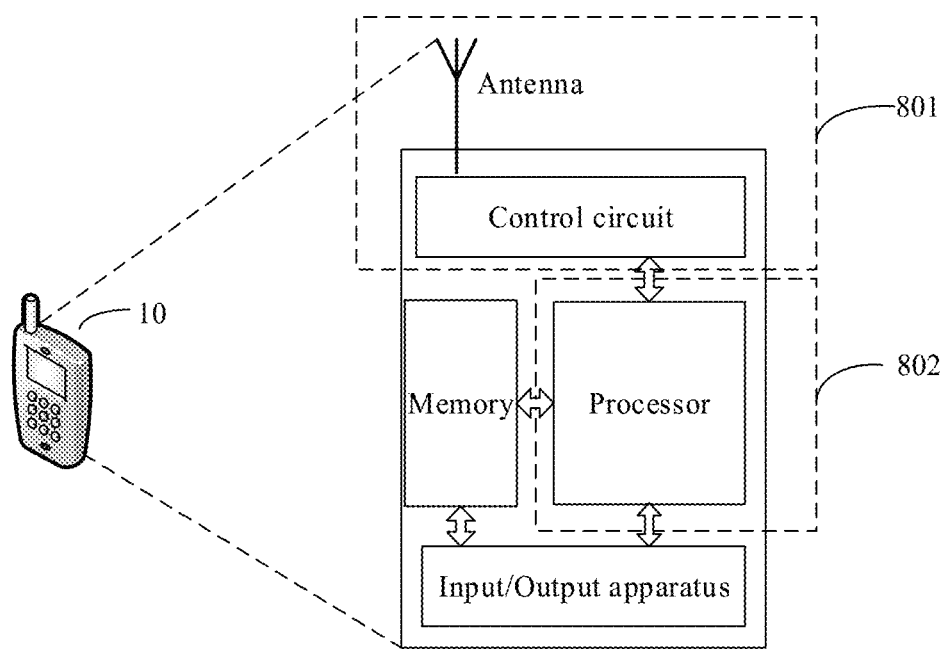
FIG. 8 is a schematic structural diagram of a terminal according to an embodiment of the present invention.

FIG. 8 is a schematic structural diagram of a terminal. The terminal may be applied to the system shown in FIG. 1. For ease of description, FIG. 8 shows merely main components of the terminal. As shown in FIG. 8, the terminal 10 includes a processor, a memory, a control circuit, an antenna, and an input/output apparatus. The processor is mainly configured to process a communication protocol and communication data, control the entire terminal, execute a software program, and process data of the software program. The memory is mainly configured to store a software program and data, for example, a codebook described in the foregoing embodiment. The control circuit is mainly used for conversion between a baseband signal and a radio frequency signal and processing of the radio frequency signal. The control circuit and the antenna may also be jointly referred to as a transceiver that is mainly configured to receive/send a radio frequency signal in an electromagnetic wave form. The input/output apparatus, such as a touchscreen, a display, or a keyboard, is mainly configured to receive data entered by a user and output data to the user.

After the terminal is powered on, the processor may read the software program in the storage unit, interpret and execute an instruction of the software program, and process the data of the software program. When data needs to be sent wirelessly, the processor performs baseband processing on the to-be-sent data, and then outputs a baseband signal to a radio frequency circuit. After performing radio frequency processing on the baseband signal, the radio frequency circuit sends a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data and processes the data.

A person skilled in the art may understand that, for ease of description, FIG. 8 shows only one memory and one processor. Actually, the terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communication protocol and communication data, and the central processing unit is mainly configured to control the entire terminal, execute a software program, and process data of the software program. A function of the baseband processor and a function of the central processing unit are integrated into the processor in FIG. 8. A person skilled in the art may understand that the baseband processor and the central processing unit may be alternatively processors independent of each other, and are interconnected by using technologies such as a bus. A person skilled in the art may understand that, the terminal may include a plurality of baseband processors to adapt to different network standards, the terminal may include a plurality of central processing units to enhance a processing capability of the terminal, and all components of the terminal may be connected by using various buses. The baseband processor may be alternatively expressed as a baseband processing circuit or a baseband processing chip. The central processing unit may be alternatively expressed as a central processing circuit or a central processing chip. A function of processing a communication protocol and communication data may be embedded into the processor, or may be implemented in a storage unit in a form of a software program, so that the processor executes the software program to implement a baseband processing function.

For example, in this embodiment of the present invention, the antenna and the control circuit that have receiving and sending functions may be considered as a transceiver unit 801 of the terminal 10, and the processor having a processing function may be considered as a processing unit 802 of the terminal 10. As shown in FIG. 8, the terminal 10 includes the transceiver unit 801 and the processing unit 802. The transceiver unit may also be referred to as a transceiver, a transceiver, a transceiver apparatus, or the like. In one embodiment, a component in the transceiver unit 801 that is configured to implement a receiving function may be considered as a receiving unit, and a component in the transceiver unit 801 that is configured to implement a sending function may be considered as a sending unit, and in other words, the transceiver unit 801 includes the receiving unit and the sending unit. For example, the receiving unit may also be referred to as a receiver, a receiver, a receiver circuit, or the like, and the sending unit may be referred to as a transmitter, a transmitter, a transmit circuit, or the like.

The terminal may be configured to implement the method in the foregoing method embodiment, and details are as follows:

The transceiver is configured to receive a control channel, where the control channel is used to carry control information, a position of an orthogonal frequency division multiplexing OFDM symbol, to which the control channel is mapped, in a time unit is at least one position in a position set, the time unit is a subframe, a slot, or a mini-slot, the control information is used to schedule at least one resource unit, and the resource unit includes at least one OFDM symbol; and the processor is configured to detect the control channel.

In one embodiment, the transceiver is further configured to receive first signaling, where the first signaling includes an index of the OFDM symbol to which the control channel is mapped.

In one embodiment, the transceiver is further configured to receive second signaling, where the second signaling indicates at least one type of the following information of the at least one resource unit: time domain information, frequency domain information, and code domain information.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible to a computer, or a data storage device, such as a server or a data center integrating one or more available media. The available medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. An information transmission method, comprising:
 sending, by a first device, control information to a second device, wherein the control information is carried on a control channel, and an orthogonal frequency division multiplexing (OFDM) symbol to which the control channel is mapped is included in at least one position in a position set of the control channel in a time unit, wherein the time unit includes one or more or a combination of: a subframe, a slot, and/or a mini-slot, wherein the control information is used to schedule at least one resource unit, and the resource unit comprises at least one OFDM symbol, and the control information comprises at least one type of the following information of the at least one resource unit: time domain information, frequency domain information, and/or code domain information, wherein the at least one resource unit is distributed in one or more or a combination of: a plurality of subframes; a plurality of slots; and/or a plurality of mini-slots.

2. The method according to claim 1, wherein:

the position set comprises at least one of the following elements: OFDM symbol #3 in a subframe, OFDM symbol #5 in the subframe, OFDM symbol #6 in the subframe, OFDM symbol #9 in the subframe, OFDM symbol #10 in the subframe, OFDM symbol #12 in the subframe, or OFDM symbol #13 in the subframe, wherein # represents the number in the subframe; or the position set comprises at least one of the following elements: OFDM symbol #2 in a slot, OFDM symbol #3 in the slot, OFDM symbol #5 in the slot, OFDM symbol #6 in the slot, OFDM symbol #9 in the slot, OFDM symbol #10 in the slot, OFDM symbol #12 in the slot, or OFDM symbol #13 in the slot, wherein # represents the number in the slot.

3. The method according to claim 1, further comprising:
sending, by the first device, first signaling to the second device, wherein the first signaling comprises an index of the OFDM symbol to which the control channel is mapped.

4. The method according to claim 1, further comprising:
sending, by the first device, second signaling to the second device, wherein the second signaling indicates at least one type of the following information of the at least one resource unit: time domain information, frequency domain information, or code domain information.

5. A network device, comprising:
a processor, configured to generate control information, wherein the control information is carried on a control channel, and an orthogonal frequency division multiplexing (OFDM) symbol to which the control channel is mapped is included in at least one position in a position set of the control channel in a time unit, wherein the time unit includes one or more or a combination of: a subframe, a slot, and/or a mini-slot, the control information is used to schedule at least one resource unit, and the resource unit comprises at least one OFDM symbol, and the control information comprises at least one type of the following information of the at least one resource unit: time domain information, frequency domain information, and/or code domain information, wherein the at least one resource unit is distributed in one or more or a combination of: a plurality of subframes; a plurality of slots; and/or a plurality of mini-slots; and
a transceiver, configured to send the control information.

6. The network device according to claim 5, wherein:
the position set comprises at least one of the following elements: OFDM symbol #3 in a subframe, OFDM symbol #5 in the subframe, OFDM symbol #6 in the subframe, OFDM symbol #9 in the subframe, OFDM symbol #10 in the subframe, OFDM symbol #12 in the subframe, or OFDM symbol #13 in the subframe, wherein # represents the number in the subframe; or the position set comprises at least one of the following elements: OFDM symbol #2 in a slot, OFDM symbol #3 in the slot, OFDM symbol #5 in the slot, OFDM symbol #6 in the slot, OFDM symbol #9 in the slot, OFDM symbol #10 in the slot, OFDM symbol #12 in the slot, or OFDM symbol #13 in the slot, wherein # represents the number in the slot.

7. The network device according to claim 5, wherein:
the transceiver is further configured to send first signaling, wherein the first signaling comprises an index of the OFDM symbol to which the control channel is mapped.

8. The network device according to claim 5, wherein:
the transceiver is further configured to send second signaling, wherein the second signaling indicates at least one type of the following information of the at least one resource unit: time domain information, frequency domain information, or code domain information.

9. The network device according to claim 5, wherein the time domain information comprises at least one of the following: a time domain length of the resource unit or a start position of the resource unit.

10. A terminal, comprising:
a transceiver, configured to receive a control channel, wherein the control channel is used to carry control information, and an orthogonal frequency division multiplexing (OFDM) symbol to which the control channel is mapped is included in at least one position in a position set of the control channel in a time unit, wherein the time unit includes one or more or a combination of: a subframe, a slot, and/or a mini-slot, the control information is used to schedule at least one resource unit, and the resource unit comprises at least one OFDM symbol, and the control information comprises at least one type of the following information of the at least one resource unit: time domain information, frequency domain information, and/or code domain information, wherein the at least one resource unit is distributed in one or more or a combination of: a plurality of subframes; a plurality of slots; and/or a plurality of mini-slots; and
a processor, configured to detect the control channel.

11. The terminal according to claim 10, wherein:
the position set comprises at least one of the following elements: OFDM symbol #3 in a subframe, OFDM symbol #5 in the subframe, OFDM symbol #6 in the subframe, OFDM symbol #9 in the subframe, OFDM symbol #10 in the subframe, OFDM symbol #12 in the subframe, or OFDM symbol #13 in the subframe, wherein # represents the number in the subframe; or the position set comprises at least one of the following elements: OFDM symbol #2 in a slot, OFDM symbol #3 in the slot, OFDM symbol #5 in the slot, OFDM symbol #6 in the slot, OFDM symbol #9 in the slot, OFDM symbol #10 in the slot, OFDM symbol #12 in the slot, or OFDM symbol #13 in the slot, wherein # represents the number in the slot.

12. The terminal according to claim 10, wherein:
the transceiver is further configured to receive first signaling, wherein the first signaling comprises an index of the OFDM symbol to which the control channel is mapped.

13. The terminal according to claim 10, wherein:
the transceiver is further configured to receive second signaling, wherein the second signaling indicates at least one type of the following information of the at least one resource unit: time domain information, frequency domain information, or code domain information.

14. The terminal according to claim 10, wherein the time domain information comprises at least one of the following: a time domain length of the resource unit or a start position of the resource unit.

* * * * *